United States Patent
Siddique

(10) Patent No.: US 9,292,037 B2
(45) Date of Patent: Mar. 22, 2016

(54) SYSTEMS AND METHODS FOR RESOLVING CLOCK TIME BETWEEN ASYNCHRONOUS TIME DOMAINS

(71) Applicant: Tektronix, Inc., Beaverton, OR (US)

(72) Inventor: Asif Siddique, Allen, TX (US)

(73) Assignee: Tektronix Texas, Inc., Westford, MA (US)

(*) Notice: Subject to any disclaimer, the term of this patent is extended or adjusted under 35 U.S.C. 154(b) by 340 days.

(21) Appl. No.: 14/153,730

(22) Filed: Jan. 13, 2014

(65) Prior Publication Data

US 2015/0198969 A1 Jul. 16, 2015

(51) Int. Cl.
| | |
|---|---|
| G06F 1/12 | (2006.01) |
| H04L 7/00 | (2006.01) |
| G06F 15/16 | (2006.01) |
| G06F 1/00 | (2006.01) |
| G06F 5/00 | (2006.01) |
| H03M 7/00 | (2006.01) |
| H03M 5/00 | (2006.01) |
| H03M 9/00 | (2006.01) |
| G06F 3/023 | (2006.01) |
| G06F 13/42 | (2006.01) |
| G06F 1/14 | (2006.01) |
| G06F 5/06 | (2006.01) |
| H04J 3/06 | (2006.01) |
| G06F 15/173 | (2006.01) |

(52) U.S. Cl.
CPC *G06F 1/12* (2013.01); *G06F 3/023* (2013.01); *G06F 13/42* (2013.01); *G06F 1/14* (2013.01); *G06F 5/06* (2013.01); *G06F 15/17325* (2013.01); *H04J 3/0638* (2013.01)

(58) Field of Classification Search
CPC ....... G06F 1/12; G06F 1/14; G06F 15/17325; G06F 13/42; G06F 3/023; G06F 5/06; H04J 3/0638
USPC ........... 713/400, 375; 702/178; 709/246, 248; 710/61; 341/50, 55, 100, 101
See application file for complete search history.

(56) References Cited

U.S. PATENT DOCUMENTS

| | | | | |
|---|---|---|---|---|
| 5,760,707 A | * | 6/1998 | Katagiri | H02K 29/08 340/870.11 |
| 2004/0003189 A1 | * | 1/2004 | England | G11C 16/102 711/156 |
| 2006/0132335 A1 | * | 6/2006 | Kojima | H03M 7/06 341/58 |

* cited by examiner

*Primary Examiner* — Ji H Bae
(74) *Attorney, Agent, or Firm* — Locke Lord LLP; Scott D. Wofsy; Christopher J. Capelli

(57) ABSTRACT

The techniques for resolving asynchronous clock times include determining at least a high resolution time period and a low resolution time period for a clock of a first time domain, generating a plurality of sequenced transition signals for the high resolution time period where each sequenced transition signal corresponds to a respective bit transition period of the high resolution clock of the first time domain, encoding the plurality of sequenced transition signals for the high resolution time period into a high resolution vector, and encoding the low resolution time period into a low resolution vector.

17 Claims, 11 Drawing Sheets

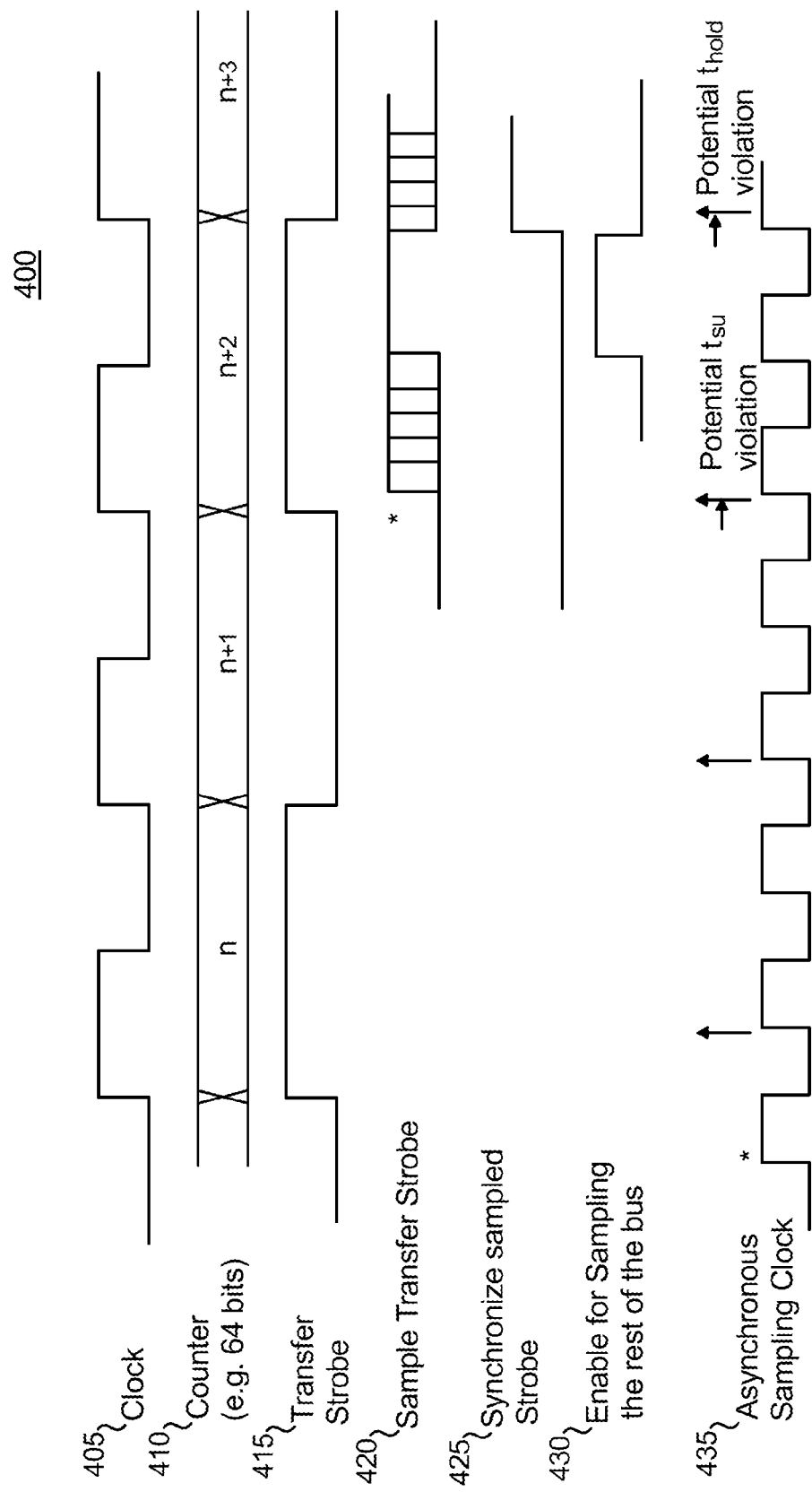

SYSTEMS AND METHODS FOR RESOLVING CLOCK TIME BETWEEN ASYNCHRONOUS TIME DOMAINS

BACKGROUND

1. Field of the Invention

The present disclosure generally relates to digital communications and, more particularly, to resolving clock time between asynchronous time domains.

2. Description of the Related Art

Often, digital devices communicate and transfer data across differing clock domain boundaries. Signals or data crossing these different clock time domain boundaries can develop errors if not properly synchronized.

In conventional clock and data synchronization systems, handshake circuits and synchronizers are used to facilitate such data transfers and resolve asynchronous transfer related timing issues. Typically, flip-flops or FIFO elements are used, which can hold data from one clock domain, i.e. the load value constant or stable until the other, asynchronous clock domain can sample the data, typically under controlled sampling point. However, holding data constant or stable can typically lead to slower system response times and/or it may impact the accuracy of the transfers in particular, if the destination is running at a comparable or slower clock speed with respect to the source. In the aggregate, this leads to an overall slower or reduced system performance.

Although the conventional techniques such as handshake circuits and synchronizers have generally been considered satisfactory for their intended purpose, there is still a need in the art for improved techniques that accurately and efficiently resolve cyclic and recurring data transfers such as, clock times between asynchronous time domains.

SUMMARY

The techniques described herein provide for efficiently and accurately resolving recurring transfer of cyclic data across asynchronous time domains (e.g., between digital circuits, sub-systems, etc.) without impacting system response time, while maintaining a controlled level of system-wide precision. Further, these techniques support predictable and continuous transfer of data across asynchronous clock domains, in particular, from a faster to a comparable or slower time domain. The technique can be extended to transfers from one source to multiple, mutually asynchronous, destinations.

In one example embodiment, the techniques split up cyclic data exchange (such as, clock time) across time domain boundaries into a high resolution time period and a low resolution time period for a first digital circuit. The low resolution period is encoded into a low resolution vector, which does not change often and can be sampled consistently by a second digital circuit having an asynchronous clock. In effect, the second digital circuit samples the low resolution vector at a higher sampling rate. With respect to the high resolution time period (e.g., a "faster" resolution period relative to the low resolution time period), a set of sequenced transitions are generated by the first digital circuit such that each high resolution bit period or transition is associated with a single signal (e.g., one signal toggles or transitions out of the encoded set for each bit transition). The set of sequenced transitions is encoded into a high resolution vector, which is sampled as a bus by the second digital circuit. After sampling the low resolution vector and the high resolution vector, the second digital circuit decodes the vectors to determine the clock time of the corresponding, first digital circuit.

In another exemplary embodiment, a digital circuit (e.g., a field programmable gate array device, an application-specific integrated circuit (ASIC) device, and a complex programmable logic devices (CPLD), etc.) resolves time between one or more asynchronous clock domains. The digital circuit determines at least a high resolution time period and a low resolution time period for a clock of a first time domain and generates a plurality of sequenced transition signals for the high resolution time period. Notably, each sequenced transition signal corresponds to a respective bit transition of the high resolution clock time period of the first time domain. The digital circuit further encodes the plurality of sequenced transition signals for the high resolution time period into a high resolution vector, and also encodes the low resolution time period into a low resolution vector. The digital circuit also continuously updates the high resolution vector and the low resolution vector to reflect a current clock time of the first time domain.

A second digital circuit, which operates according to an asynchronous clock of a second time domain, samples the high resolution vector and the low resolution vector and decodes and interprets each of these vectors (e.g., the high resolution vector and the low resolution vector) to yield a tabulated clock time for the first time domain. Notably, the second digital circuit (in certain embodiments) samples the encoded high resolution vector as a digital bus (e.g., since the high resolution vector comprises a plurality of sequenced transition signals). In this fashion, the second digital circuit acquires the time maintained by the first digital circuit (e.g., via the high resolution vector and the low resolution vector), Further, the second digital circuit can acquire the time maintained by the first digital circuit every clock cycle of the second digital circuit.

Notably, in various embodiments described herein, the clock of the first digital circuit can be maintained as a system wide entity (and possibly distributed) at a higher precision level in terms of the clock representing the first time domain. Accordingly, the first time domain can be comparable (e.g., similar in clock frequency) or inherently faster with respect to the asynchronous clock(s) of the second time domain(s).

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 4A illustrates a signaling diagram, showing a handshake or control signals used to transfer data across asynchronous clock domains, generally applicable for data transfers from a slower to a faster clock domain;

A component or a feature that is common to more than one drawing is indicated with the same reference number in each of the drawings.

DESCRIPTION OF EXAMPLE EMBODIMENTS

As discussed above, the subject disclosure provides techniques that efficiently and accurately support predictable and continuous transfer of cyclic data across asynchronous clock domains that have comparable time periods or from a faster to a slower time domain. For example, system and devices that include varying clock domains include devices in a communication network.

A communication network is a geographically distributed collection of nodes or devices interconnected by communication links and segments for transporting data there-between. Network nodes or devices can include, for example, personal computers, servers and workstations, or other devices, such as sensors, digital circuits, Field Programmable Gate Arrays (FPGAs), Application-Specific Integrated Circuit (ASIC) devices, complex programmable logic devices (CPLD) and the like.

Figure 1:
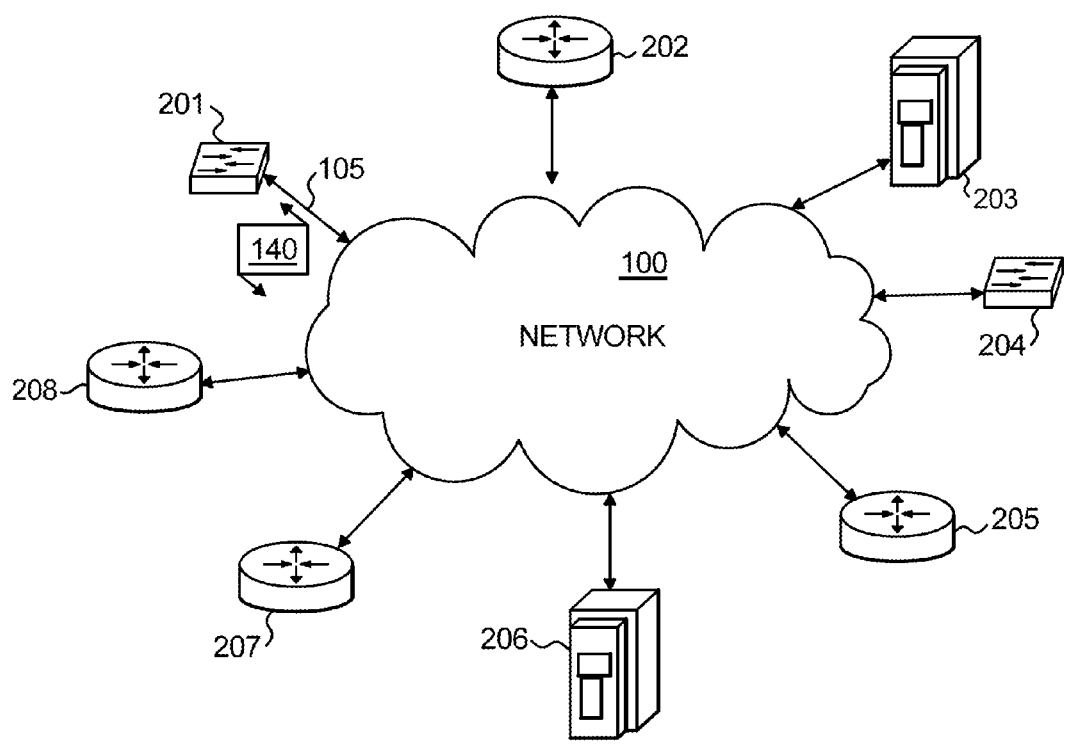
FIG. 1 illustrates an example communication network.

FIG. 1 is a schematic block diagram of an example communication network 100 illustratively comprising nodes/devices (e.g., labeled as shown, 201 through 208) interconnected by various methods of communication. For instance, the links 105 may be wired links or may comprise a wireless communication medium. Moreover, each of the devices can communicate data packets (or frames) 140 with other devices using predefined network communication protocols as will be appreciated by those skilled in the art, such as various wired protocols and wireless protocols etc., where appropriate. Those skilled in the art will understand that the view shown herein is for simplicity and any number of nodes, devices, links, etc. may be used in the communication network as well as any type of communication links may be used.

Figure 2:
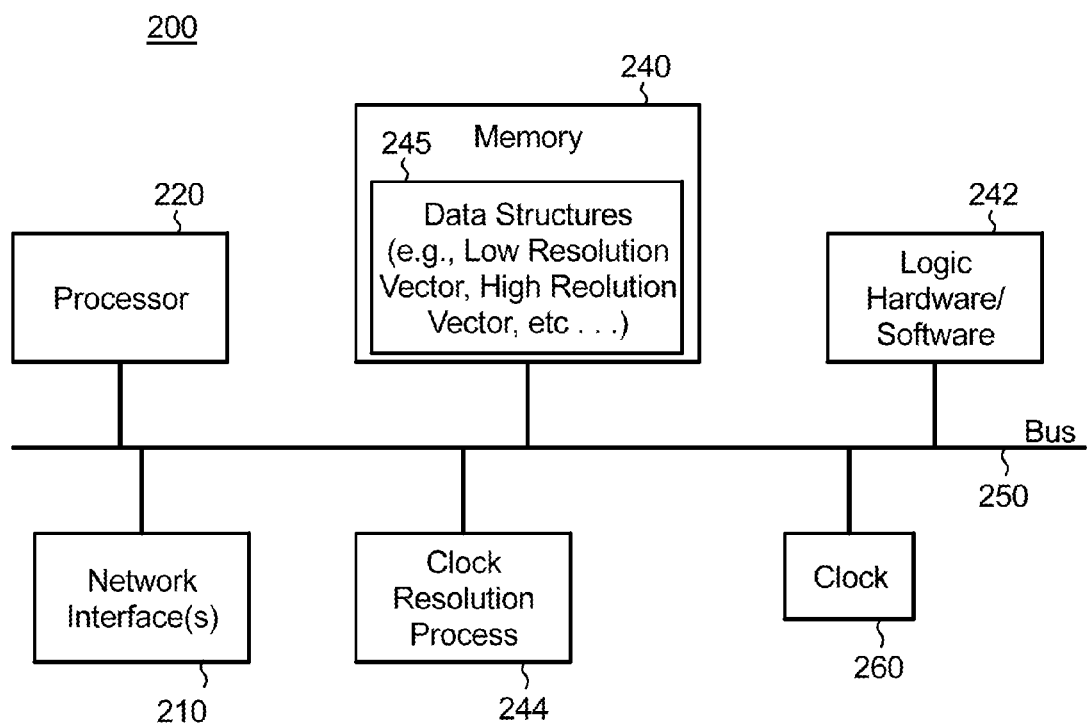
FIG. 2 illustrates an example network device/node of the communication network shown in FIG. 1.

FIG. 2 is a schematic block diagram of an example node/device 200 that may be used with one or more embodiments described herein, e.g., as one of nodes 201 through 208 in the communication network 100. The device may comprise one or more network interfaces 210, at least one processor 220 (e.g., an 8-64 bit microcontroller), logic hardware/software 242 and a memory 240 interconnected by a system bus 250, as well as a clock 260.

The network interface(s) 210 contain the mechanical, electrical, and signaling circuitry for communicating data over physical and/or wireless links coupled to the network 100. The network interfaces may be configured to transmit and/or receive data using a variety of different communication protocols as is appreciated by those skilled in the art.

The memory 240 comprises a plurality of storage locations that are addressable by the processor 220 and the network interfaces 210 for storing software programs and data structures 245 associated with the embodiments described herein. Notably, certain devices may have limited memory or no memory (e.g., no memory for storage other than for programs/processes operating on the device).

The processor 220 may comprise necessary elements or logic adapted to execute the software programs and manipulate data structures 245. Logic hardware/software 242 (portions of which are typically resident in memory 240 and executed by the processor), functionally organizes the device by, inter alia, invoking operations in support of software processes and/or services executing on the device. While the description illustrates various processes, it is expressly contemplated that various processes may be embodied as modules configured to operate in accordance with the techniques herein (e.g., according to the functionality of a similar process).

Illustratively, the techniques described herein may be performed by logic hardware/software 242, and/or firmware, such as in accordance with the clock resolution process 244, which may contain computer executable instructions executed by the processor 220 (or independent processor of the network interfaces 210) to perform functions relating to the techniques described herein.

As noted above, although conventional approaches to resolving recurring, cyclic data exchange such as clock time between asynchronous devices or systems have generally been considered satisfactory for their intended purpose, there is still a need in the art for improved techniques that accurately and efficiently resolve such data transfers between asynchronous time domains.

For example, some approaches for controlling the data transfer of a signal from a first circuit element in a first clocking domain, to a second circuit element in a second clocking domain further include retiming the signal clocked into the second clock domain, and ensuring that the rate of change of information being transferred and the sampling instance is okay between the domains. However, such approach relies on availability of a clean sample at a valid sampling instance.

Figure 3:
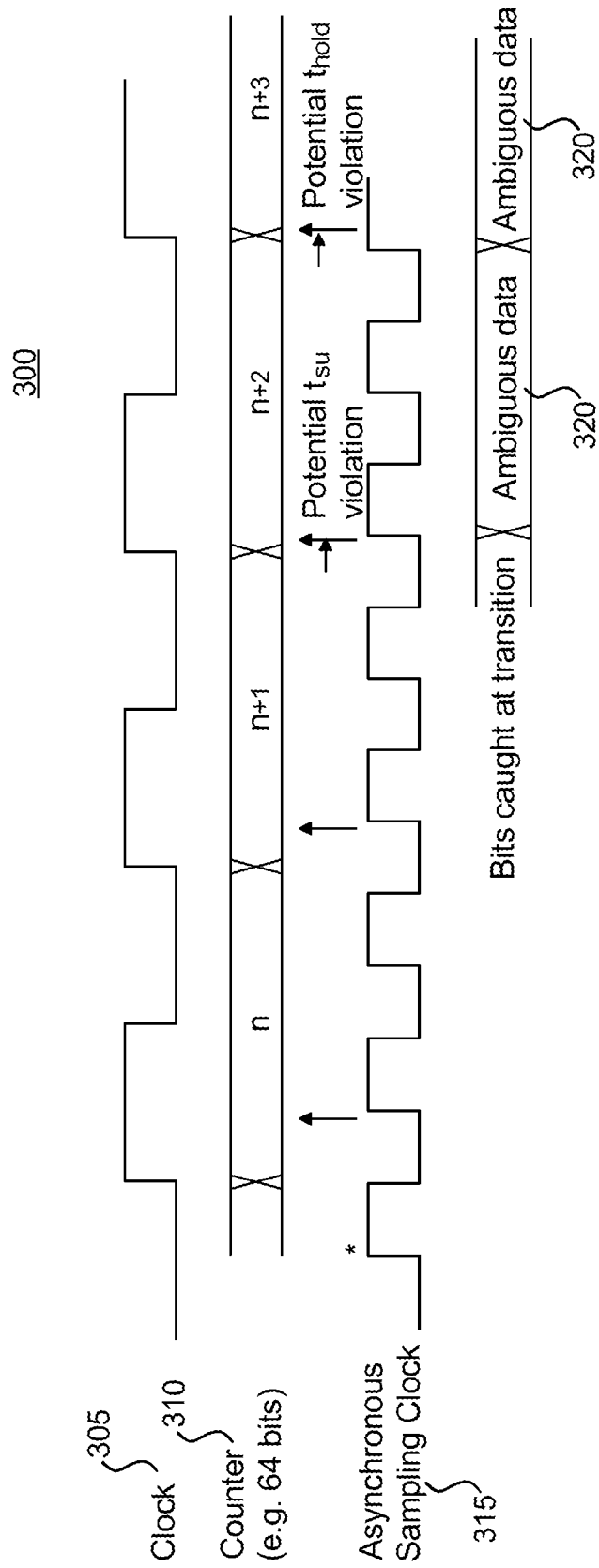
FIG. 3 illustrates a signaling diagram, showing a running count sampled arbitrarily and directly by a destination clock.

Referring now to FIG. 3, a signal diagram 300 illustrates a running count—counter 310 sampled arbitrarily and directly by a destination clock—asynchronous sampling clock 315. As shown, violations occur due to the asynchronous nature of clock 305 with respect to clock 315. That is, multiple bits can potentially change while being sampled leading to meta-stability issues and erroneous data sampling. Put differently, asynchronous sampling clock 315 eventually samples counter 310 (which operates according to clock 305) during a transition (e.g., high to low or low to high) yielding ambiguous data 320. To overcome the timing issues shown in FIG. 3, controls can be used (e.g., a handshake, set/hold signals, etc.). For example, such a handshake is shown in signaling diagrams 400-401 illustrated in FIGS. 4A-4B, respectively.

FIG. 4A illustrates a signaling diagram 400, showing a controlling handshake between clock 405 and asynchronous sampling clock 435. For example, according to signaling diagram 400, instead of arbitrarily sampling an entire signal vector 410, which can result in multiple bits potentially sampled at the transition time (which corrupts the sampled value), the asynchronous clock 435 determines a reasonable sampling point based on sampling a single bit strobe 415 operating off the clock 405. This sampled signal, shown in the figure as 420 is then used to generate a sample enable signal 430 which designates the controlled sample point for sampling-in the rest of the data exchange, counter 410. Notably, in signaling diagram 400, clock 435 is operating an order of a magnitude faster with respect to clock 405 and to function properly, the entire exchange process takes more than 1 clock cycle of clock 435. Further, counter 410 (e.g., the exchanged data value) is not changing its value during the entire course of this exercise because of the relative relationship of clock frequencies (clock 435 operating at an order of magnitude faster than clock 405, noted above).

Figure 4B:
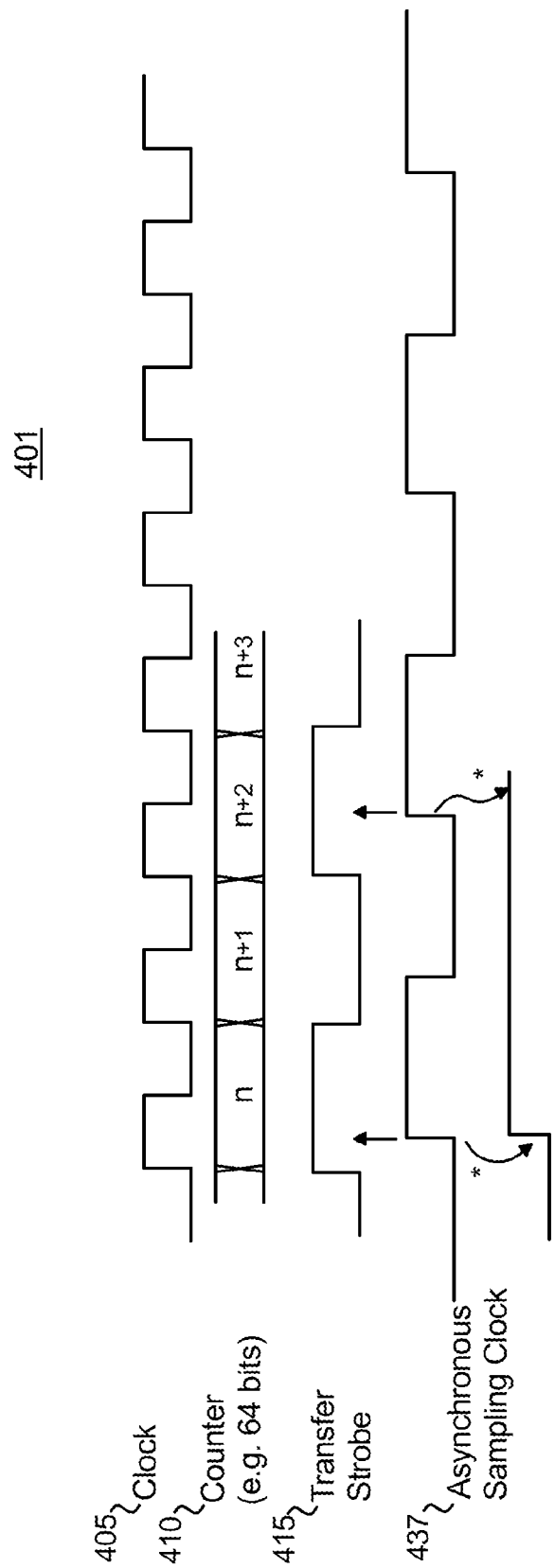
FIG. 4B illustrates signaling diagram, showing issues of sample overrun despite a handshake when transferring data across asynchronous clock domains in case of, comparable or faster to slower clock domain transfer.

FIG. 4B provides signaling diagram 401, showing issues of a sample over run due to comparable time periods for clock 405 and asynchronous sampling clock 437. That is, the asynchronous sampling clock 437 does not have enough time in its clock period to resolve the continuously changing transfer strobe 415 prior to reading the data for counter 410. As clock 437 operates closer to operating speeds of clock 405, count 410 and signaling strobe 415 potentially faster than a time period of clock 437 causing an overrun. Notably, signaling diagram 401 also exemplifies a case where clock 405 is faster than clock 437.

In order to achieve a high degree of accuracy and precision for time stamping data distributed across asynchronous time domains such as, across multiple nodes in a communication network 100 or even within devices contained in a single node, the techniques provided herein enable maintaining a high precision system time and distributing a clock time across various asynchronous clock time domains. The distributed clock time is used to time stamp data packets at ingress to all interfaces of respective asynchronous digital circuits. As discussed above, the techniques provided include clock resolution process/services 244, which in conjunction with logic hardware/software 242 and/or firmware, parses or splits up a clock time into a high resolution time period and a low resolution time period, which are encoded into respective vectors. The high resolution time period (e.g., a "faster" resolution period relative to the low resolution time period) is encoded into a vector that corresponds to a set of sequenced transitions, is generated by an originating digital circuit (e.g., a first digital circuit) wherein each transition is associated with a single signal (e.g., one signal toggles or transitions out of the encoded set for each bit transition). This encoding and controlled manipulation of the encoded data vectors limits the number of potentially changing bits per clock cycle of the asynchronous sampling clock to a single bit error out of the encoded data set. This allows limiting and controlling the error in time vector sampling down to a +/−1 high resolution clock bit period. The encoded high resolution vector is sampled as a bus by an ingress or sampling digital circuit (e.g., a second digital circuit), which decodes both the low resolution vector and the high resolution vector to determine a clock time for the originating digital circuit.

Figure 5A:
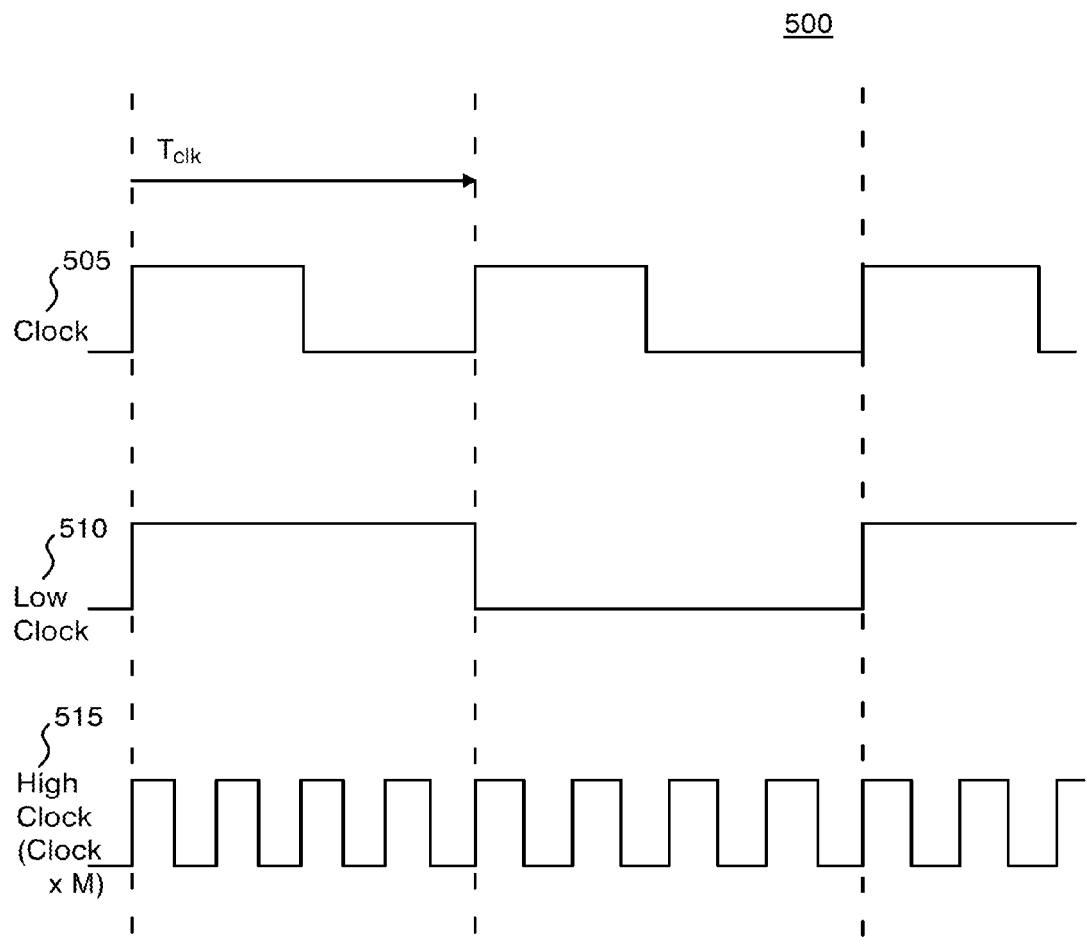
FIG. 5A illustrates a signaling diagram, showing a clock having a clock period.

FIGS. 5A-5D, collectively, illustrate signal diagrams highlighting the above discussed data transfer resolution techniques. In particular, FIG. 5A illustrates a signaling diagram 500 showing a clock 505 having a clock period $T_{clk}$. Clock 505 is treated as comprising two clocks—a low clock 510 and a high clock 515 (e.g., Clock×M). Notably, low clock 510 corresponds to a low resolution time period for clock 505 and high clock 515 corresponds to a high resolution time period for clock 505. Note that the mention of clock 510 is for conceptual generality. Practically, clock 505 and clock 510 can be one and the same.

Figure 5B:
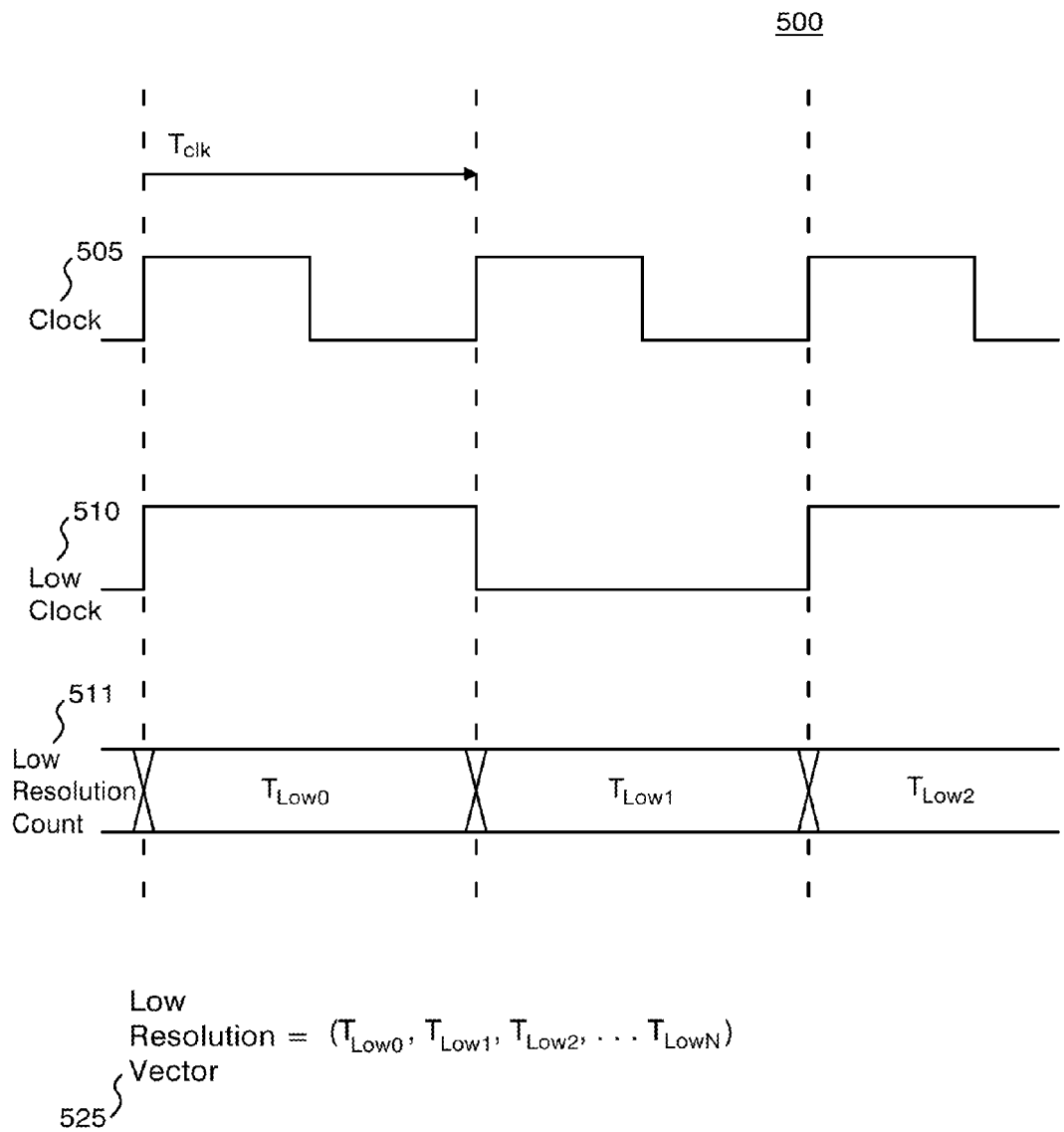
FIG. 5B illustrates a signal diagram, showing a low resolution time period encoded into a low resolution vector.

FIG. 5B illustrates a signal diagram 501, showing the low resolution time period a low resolution vector 525. In particular, a low resolution count 511 maintains a count for each cycle of low clock 510 (i.e., $T_{LOW0}$, $T_{LOW1}$, $T_{LOW2}$, etc.). Low resolution vector 525 comprises set of the low resolution count values 511.

Figure 5C:
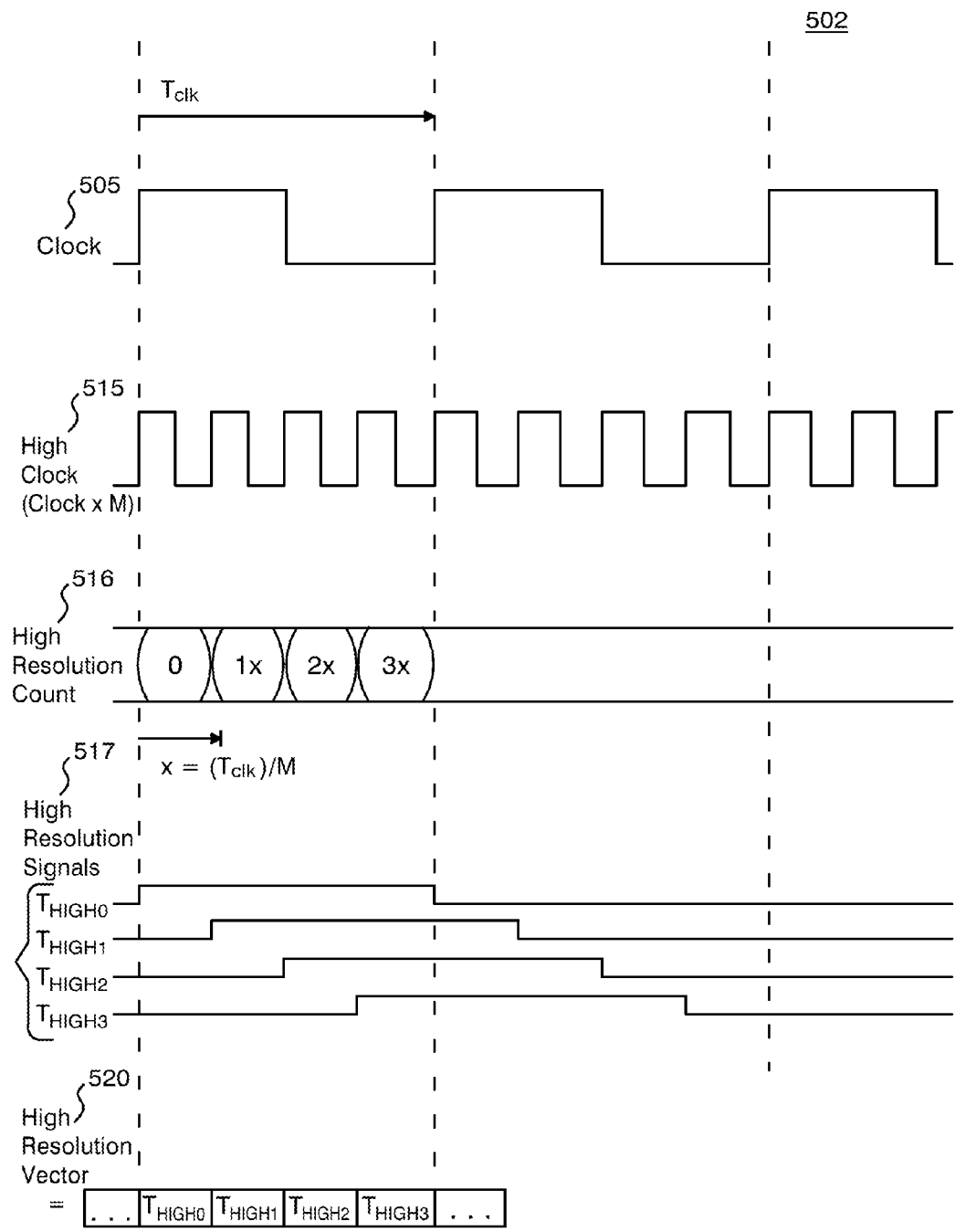
FIG. 5C illustrates a signal diagram 502, showing a high resolution time period encoded into a high resolution vector.

FIG. 5C illustrates a signal diagram 502, showing the high resolution time period encoded into a high resolution vector 520. A high resolution count 516 maintains a count for each cycle of high clock 515. Importantly, each count increment (e.g., 0, 1×, 2×, etc.) is associated with one of the sequenced transition signals—i.e., $T_{HIGH0}$, $T_{HIGH1}$, $T_{HIGH3}$ or collectively referred to as high resolution signals 517. In this fashion, each high resolution signal $T_{HIGHN}$ or each sequenced transition signal corresponds to a respective bit transition or count increment of the high clock 515 and is encoded into a corresponding bit of high resolution vector 520. Accordingly, only a single signal or a single corresponding bit changes for the high resolution count time period (where $x=T_{CLK}/M$). This process is iterative over a time period that is equal to the low clock period of $T_{CLK}$.

Notably, using this encoding technique, the sampling digital circuit sees only one encoded bit uncertainty at any sampling instance. The sampling uncertainty in terms of clock time (e.g., of the first digital circuit) is less than or equal to 2, $T_{CLK}/M$ intervals.

Figure 5D:
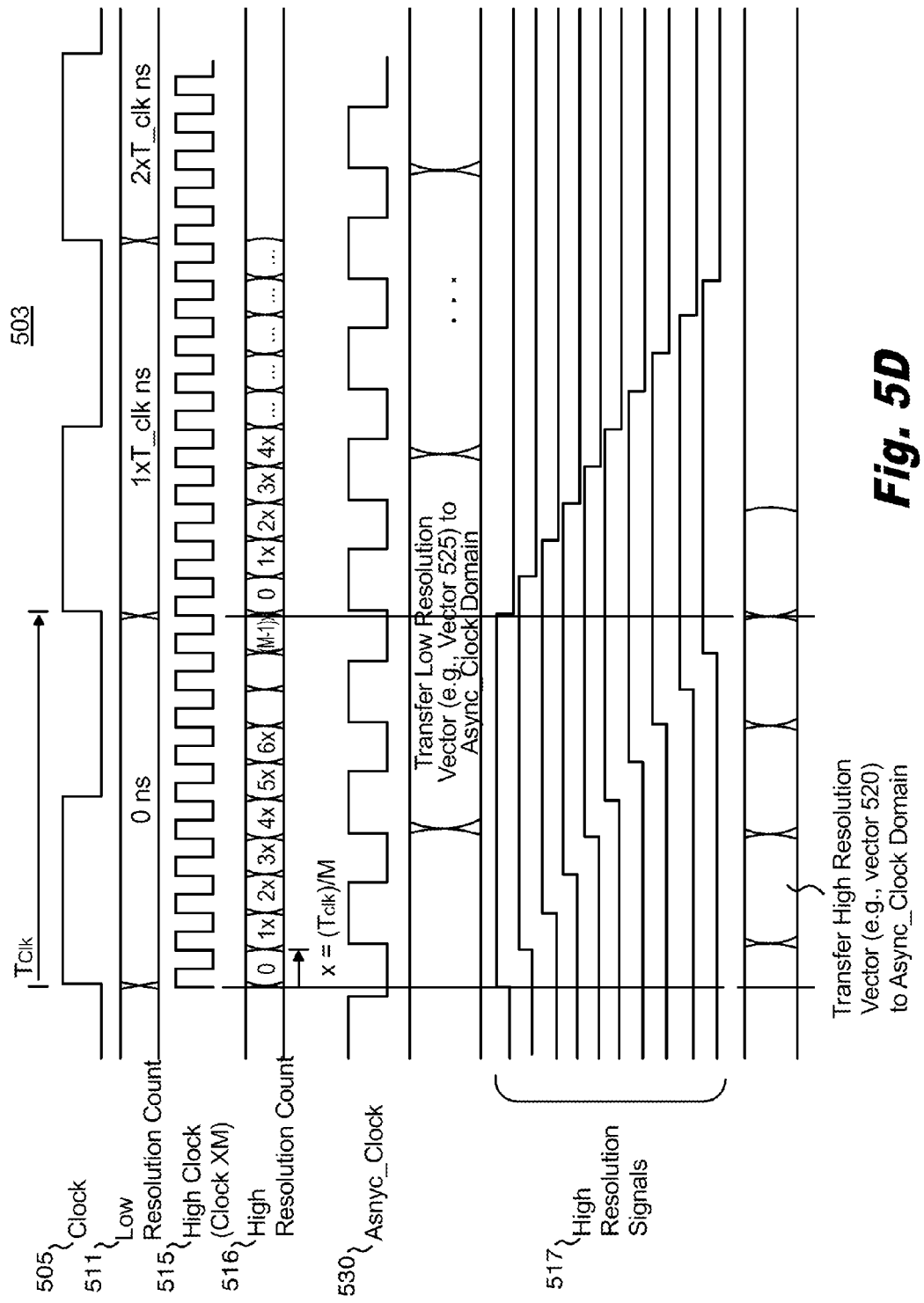
FIG. 5D illustrates an overview signal diagram, showing components of each signaling diagrams provided in FIGS. 5A-5C.

FIG. 5D illustrates an overview signal diagram 503, showing components of each signaling diagram 500-502. Using the above described techniques, a high resolution time period and a low resolution time period for clock 505 is determined and counted via low resolution count 511 and high resolution count 516, respectively. The low resolution count 511 is presented as resolution vector 525 (not shown), while the high resolution count 516 is further assigned a plurality of sequenced transition signals 517. Each of the sequenced transition signals 517 contributes to the encoded high resolution vector 520 (not shown), as discussed above. As shown in signal diagram 503, both the low resolution vector 525 and the high resolution vector 520 are transferred to or sampled by the asynchronous clock domain (e.g., when the asynchronous device samples the vectors). The sampled vectors are decoded and collectively re-tabulated by the asynchronous device to determine the clock time of clock 505. Notably, the high resolution vector, when sampled by the asynchronous device is sampled as a digital bus since each bit represents a signal transition of high clock 515.

In operation, the digital device operating at clock 505 maintains (e.g., in memory 240, data structures 245, etc.) and continuously updates high resolution vector 520 and low resolution vector 525. An asynchronous device can sample both the high resolution vector 520 and the low resolution vector 525 at any time and obtain the current clock time of the sampled device, every clock instance of the sampling clock 537. Note that the sampling process and tabulation introduces fixed latencies. Such latencies can be easily handled through pipelining in case of, digital circuits or, using delayed samples (delayed by the fixed latency amount) as oppose to the current. Such techniques for generating and maintaining the high resolution vectors and low resolution vectors obviate the problems that occur during handshake signaling. Further, such techniques provide for efficient clock data exchange between two asynchronous systems predictably resolves clock time, which can be readily tabulated from one sampling point and onwards. Such techniques can be employed, for example, in various combinations of fast and slow asynchronous systems. Further, such techniques can be employed to maintain a consistent definition of a central entity such as a system wide count and further support additional scaling (e.g., multiple asynchronous devices).

Figure 6:
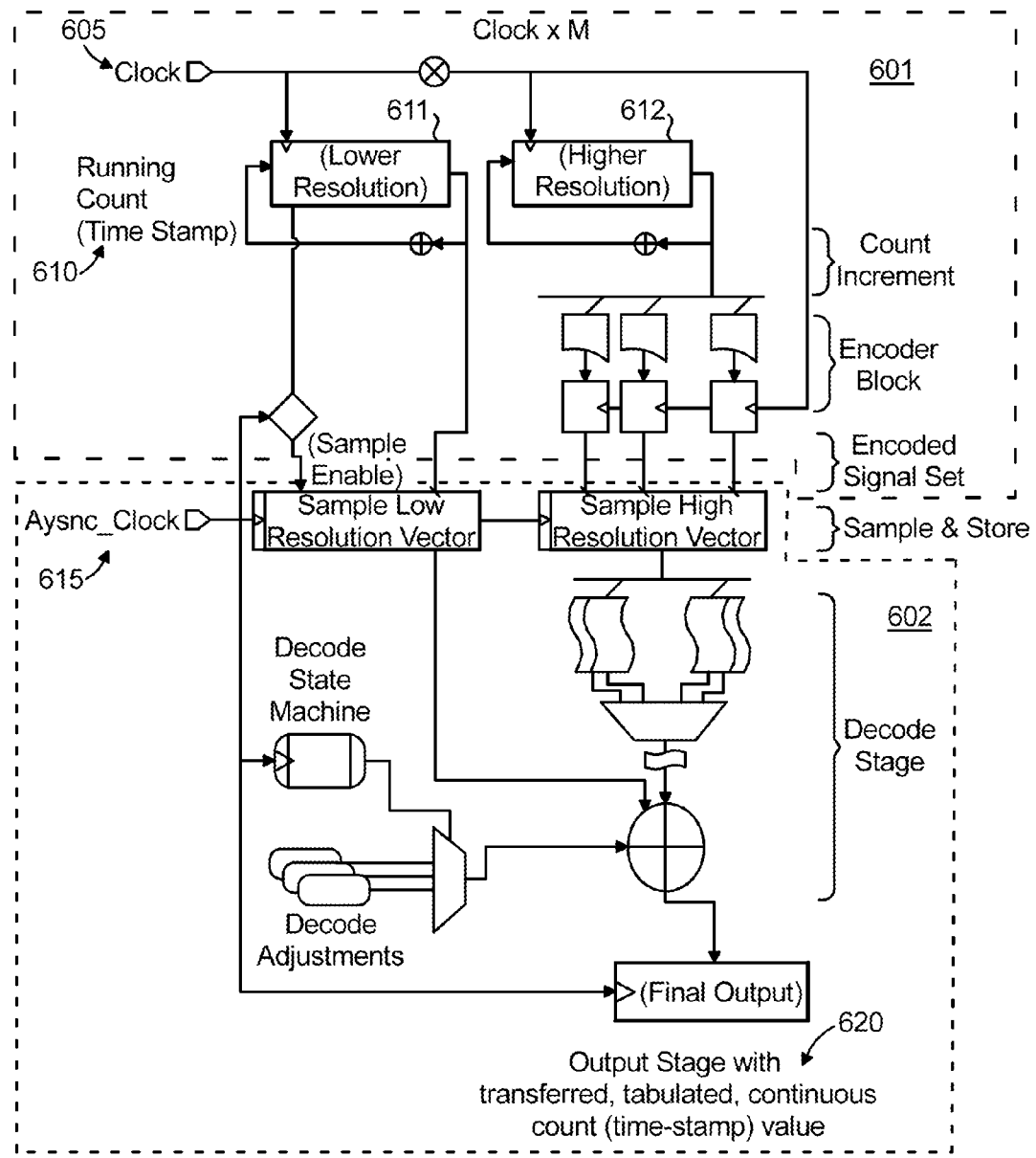
FIG. 6 illustrates digital logic of two asynchronous devices operating according to the techniques described herein.

FIG. 6 illustrates digital logic of two asynchronous device 601 and device 602 operating according to the techniques described herein and employing various digital logic hardware (e.g., similar to logic hardware/242 and/or firmware of device 200). As shown, device 601 operates according to a clock 605 of a first time domain, while device 602 operates according to asynchronous clock 615 of a second (i.e., asynchronous) time domain.

Operatively, as discussed above, device 601 determines two time periods—a low resolution time 611 and a high resolution time 612 for clock 605. When device 601 determines the high resolution time 612, it first generates a plurality of sequenced transition signals such that each transition signal corresponds to a respective bit transition of high resolution time which inherently is operating at some multiple of clock 605. Once the two time periods are determined, device 601 further encodes (e.g., via circuitry including "encoder block" and "encoded signal set") into two respective vectors—a low resolution vector and a high resolution vector.

Device 602 samples both the low resolution vector and the high resolution vector and decodes (e.g., "during decode state") the vectors to yield a final output 620 (e.g., with transferred, tabulated, continuous count (time-stamp) value for clock 605). In this fashion, device 601 and device 602 resolve clock time across relatively asynchronous clock time domains of clock 605 and clock 615.

Figure 7:
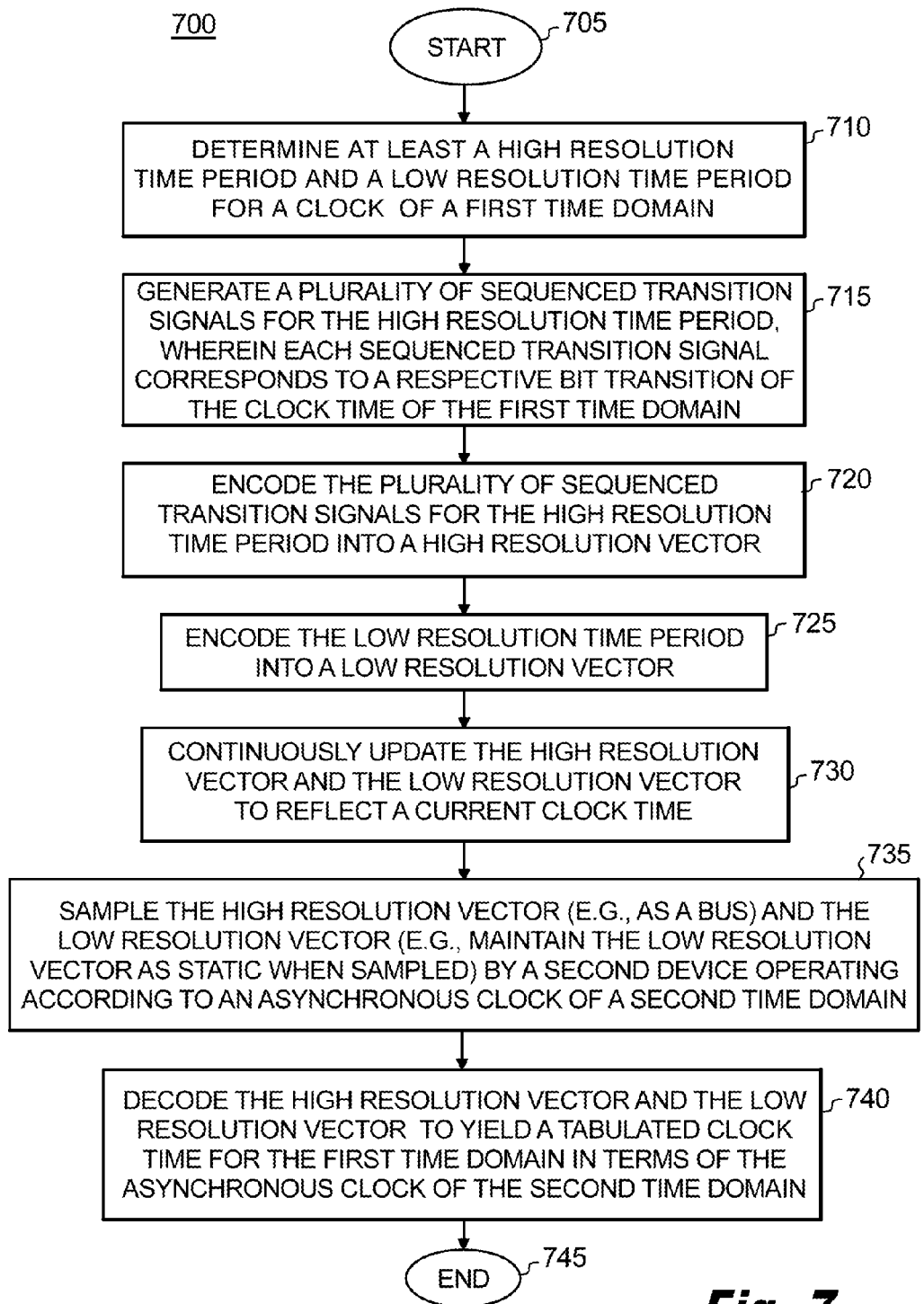
FIG. 7 illustrates an example simplified procedure for resolving clock time between asynchronous time domains according to the techniques described herein.

FIG. 7 illustrates an example simplified procedure 700 for resolving clock time between asynchronous time domains, which can be employed by any of the devices described above (i.e., device 200 of FIG. 2 and devices 601-602 of FIG. 6).

Procedure 700 begins at step 705 and continues to step 710, where as described above, a first device (e.g., a digital circuit, a Field Programmable Gate Array (FPGA), an Application-Specific Integrated Circuit (ASIC), a complex programmable logic devices (CPLD), etc.) determines at least a high resolution time period and a low resolution time period for a clock of a first time domain. The first device, in step 715, also generates a plurality of sequenced transition signals for the high resolution time period. Notably, each sequenced transition signal corresponds to a respective bit transition of the high resolution clock time period of the first time domain. The sequenced transition signals are encoded, via the first device (step 720) into a high resolution vector while the determined low resolution time is encoded into a low resolution vector (step 725). The first device further, in step 730, continuously updates the high resolution vector and the low resolution vector to reflect a current clock time (e.g., of the first device).

A second device, in step 735, samples both the high resolution vector (e.g., as a bus) and the low resolution vector, which is maintained as static when sampled. Notably, the second device operates according to an asynchronous clock of a second time domain (e.g., an asynchronous clock time). In step 740, the second device decodes the high resolution vector and the low resolution vector to yield a tabulated clock time for the first time domain. In this fashion, the asynchronous clock time of the first device can be accurately, efficiently, and predictably determined by the second device and made available every clock cycle of the second device. As illustrated, process 700 ends at step 745, but it may also continue to step 705 where the first device determines at least the high resolution time period and the low resolution time period.

It should be noted that while certain steps within procedures 700 may be optional, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for resolving clock time between asynchronous clock time domains. In particular, the techniques herein provide for splitting a clock time into a high resolution time and a low resolution time, which are encoded into corresponding high resolution vectors and low resolution vectors. Such techniques can be used by a sampling device to determine the clock time of an otherwise asynchronous source, and allows for a continuous and consistent transfer of cyclic data between two (or more) asynchronous clock time domains such as, an effective and routine transfer of a count progression between comparable clock period time domains or even from faster to slower clock time domains. Such techniques can be employed by a central entity to establish a consistent clock time and can further be scalable to any number of devices (each having different clock periods).

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for resolving clock time between at least two asynchronous clock domains, the method comprising:
   determining, via a digital circuit, at least a high resolution time period and a low resolution time period for a clock of a first time domain;
   generating, via the digital circuit, a plurality of sequenced transition signals for the high resolution time period, wherein each sequenced transition signal corresponds to a respective bit transition period of the high resolution time period of the first time domain;
   encoding, via the digital circuit, the plurality of sequenced transition signals for the high resolution time period into a high resolution vector; and
   encoding, via the digital circuit, the low resolution time period into a low resolution vector.

2. The method of claim 1, wherein the digital circuit is a first digital circuit, the method further comprising:
   sampling the high resolution vector and the low resolution vector by a second digital circuit operating according to an asynchronous clock of a second time domain; and
   decoding, via the second digital circuit, the high resolution vector and the low resolution vector to yield a tabulated clock time for the first time domain.

3. The method of claim 2, wherein, sampling the high resolution vector further comprises:
   sampling, via the second digital circuit, the encoded high resolution vector as a digital bus.

4. The method of claim 1, wherein the digital circuit is a first digital circuit, the method further comprising:
   continuously updating, via the first digital circuit, the high resolution vector and the low resolution vector to reflect a current clock time of the first time domain.

5. The method of claim 2, wherein the high resolution time period of the clock of the first time domain is faster than the asynchronous clock of a second time domain.

6. The method of claim 2, wherein the high resolution time period of the clock of the first time domain is comparable to the asynchronous clock of a second time domain.

7. The method of claim 2, wherein each of the first digital circuit and the second digital circuit is selected from the group consisting of: a field programmable gate array device, an application-specific integrated circuit (ASIC) device, and a complex programmable logic devices (CPLD).

8. The method of claim 2, wherein sampling the high resolution vector and the low resolution vector by a second digital circuit further comprises:
maintaining, via the first digital circuit, the low resolution vector as static when sampled.

9. A device operating according to a clock of a first time domain, the device comprising:
one or more network interfaces adapted to communicate in a communication network;
a processor adapted to execute one or more processes; and
a memory configured to store a process executable by the processor, the process when executed operable to:
determine at least a high resolution time period and a low resolution time period for a clock of a first time domain;
generate a plurality of sequenced transition signals for the high resolution time period, wherein each sequenced transition signal corresponds to a respective bit transition period of the high resolution time period of the first time domain;
encode the plurality of sequenced transition signals for the high resolution time period into a high resolution vector; and
encode the low resolution time period into a low resolution vector.

10. The device of claim 9, wherein the process when executed is further operable to cause a second device, operating according to an asynchronous clock of a second time domain, to sample the high resolution vector and the low resolution vector, and decode the high resolution vector and the low resolution vector to yield a tabulated clock time for the first time domain.

11. The device of claim 10, wherein the process when executed to cause the second device to sample the high resolution vector and the low resolution vector, further causes the second device to sample the encoded high resolution vector as a digital bus.

12. The device of claim 9, wherein the process when executed is further operable to:
continuously update the high resolution vector and the low resolution vector to reflect a current clock time of the first time domain.

13. The device of claim 10, wherein high resolution time period of the clock of the first time domain is faster than the asynchronous clock of the second time domain.

14. The device of claim 10, wherein the device and the second device are selected from the group consisting of: a field programmable gate array device, an application-specific integrated circuit (ASIC) device, and a complex programmable logic devices (CPLD).

15. The device of claim 10, wherein the process when executed to cause the second device to sample the high resolution vector and the low resolution vector, is further operable to:
maintain the low resolution vector as static when sampled by the second device.

16. A tangible, non-transitory, computer-readable media having software encoded thereon, the software, when executed by a processor, operable to:
determine at least a high resolution time period and a low resolution time period for a clock of a first time domain;
generate a plurality of sequenced transition signals for the high resolution time period, wherein each sequenced transition signal corresponds to a respective bit transition period of the high resolution time period of the first time domain;
encode the plurality of sequenced transition signals for the high resolution time period into a high resolution vector; and
encode the low resolution time period into a low resolution vector.

17. The tangible, non-transitory, computer-readable media of claim 16, wherein the software, when executed by the processor is further operable to:
continuously update the high resolution vector and the low resolution vector to reflect a current clock time of the first time domain.

\* \* \* \* \*